Dec. 12, 1933.  A. W. WOODWARD  1,938,615
RIM
Original Filed Nov. 2, 1929
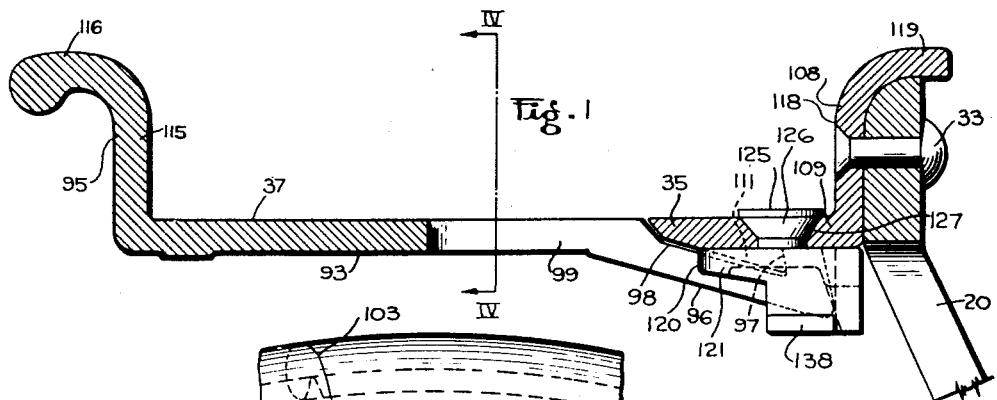
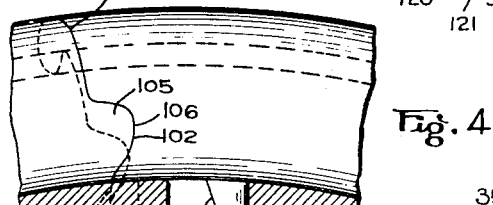
Fig. 4
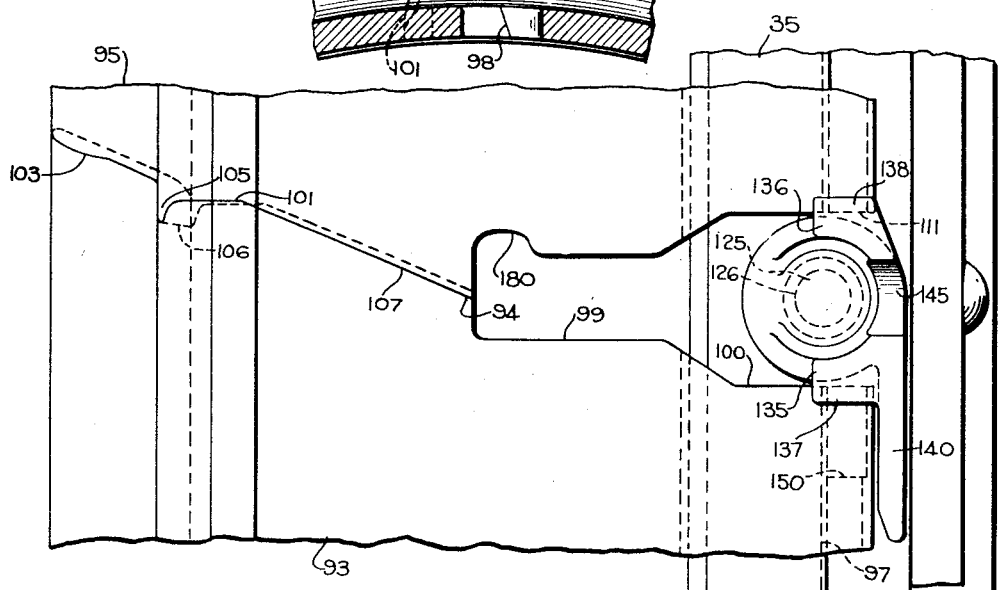
Fig. 2
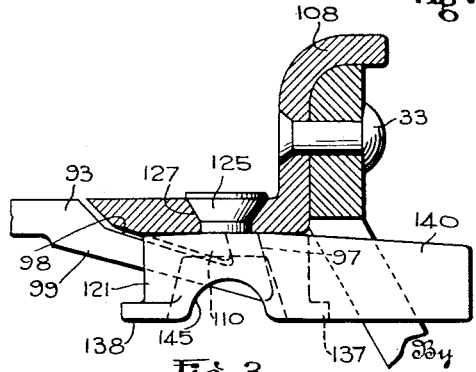
Fig. 3
Inventor
ALVA W WOODWARD
Attorney Patented Dec. 12, 1933

1,938,615

UNITED STATES PATENT OFFICE 1,938,615

RIM

Alva W. Woodward, Kent, Ohio, assignor to Wingfoot Corporation, Wilmington, Del., a corporation of Delaware Original application November 2, 1929, Serial No. 404,305. Divided and this application July 22, 1931. Serial No. 552,326

4 Claims. (Cl. 152—21)

This invention relates to vehicle wheels including rims mounted thereon, and more particularly to latch means for securing the ends of a transversely split base member of the rim together and to a particular type of split in the base section, One object of the invention is to provide a wheel and rim assembly wherein the assembly is readily assembled and demounted, and which is strong and rugged in service. It can also be readily taken apart for tire changes.

Another object of the invention is to provide a rim composed of a transversely split base portion and an endless side ring with a latching device for preventing relative movement of the transversely split portion and the side ring.

Another object of the invention is to provide a rim having a transversely split base portion and an endless side ring with a transverse split of such form that the split functions to normally lock the ends of the split portions together and which split will also function in combination with the latching means mentioned above to provide an improved rugged rim assembly.

This application is a division of applicant's copending application for "Vehicle wheel" filed November 2, 1929, and bearing Serial No. 404,305.

The invention contemplates the mounting of a rim composed of a transversely split base portion interlocked with an endless side ring, on a wheel member such as a disc. The outer peripheral edge of the disc is riveted, welded to or cast integral with the endless side ring of the rim and because of the fact that the split base portion is interlocked with the side ring, the entire rim is rigidly mounted upon the wheel member. The split in the transversely split base portion is so formed that the ends of the rim are retained positively locked together although the interlocking relation between the endless side ring and the split base portion also assists in retaining the ends of the split member in operative relation. The split in the split portion of the rim adjacent the endless side ring is enlarged to provide a valve-stem-receiving opening and also a latch which is pivoted to the endless side ring and projects radially inwardly through the enlarged portion of the split. This latch is provided with diametrically disposed locking portions which are adapted to engage the ends of the split portion of the rim when the latch is in its operative position. Also, the latch is provided with a recess which is adapted to receive the valve stem of the tire when the latch is in its operative position. When the tire is inflated, the valve stem is held firmly in the recess in the latch and hence serves to prevent accidental disengagement of the latch with the ends of the split portion of the rim. As a further means for securing the latch positively in its operative position, its pivot projects through the endless side ring of the rim and above the outer peripheral surface of the rim for engagement with a tire mounted thereon. When the tire is inflated, the pressure thereof radially upon the pivot of the latch serves to prevent turning thereof. That portion of the latch disposed between the ends of the split base portion of the rim also serves as a driving connection between the endless side ring and such split portion of the rim.

For a better understanding of the invention, reference may now be had to the accompanying drawing, forming a part of the specification, of which Fig. 1 is a transverse, sectional view through the rim assembly embodying the invention;

Fig. 2 is a fragmentary plan view taken from the lower side of Fig. 1;

Fig. 3 is a fragmentary view, on a larger scale, of the portion of the construction shown in Fig. 1 and it illustrates the latch in its inoperative position, and Fig. 4 is a cross-sectional view taken substantially on the line IV—IV of Fig. 1.

As best shown by Figures 1 and 2, the rim 37 comprises a base portion 93 transversely split, as indicated at 94. Such base portion 93 has at one side a tire-retaining flange 95 comprising a radial side wall 115 and a curved portion 116, while at its other side it has an inwardly inclined portion 96 that terminates in an outwardly projecting, substantially radial flange 97, thereby providing a gutter 98 in the outer peripheral surface of the base member at the side thereof opposite the flange 95. The transverse split 94 in the base member extends generally in a diagonal direction and communicates with a valve stem opening 99 located at the side of the rim opposite the flange 95. This valve stem opening extends from a point substantially centrally of the base member, through the inclined portion 96, and is substantially enlarged, as indicated at 100. The inner end of the valve stem opening 99 is enlarged, as indicated at 180, in order to accommodate and to prevent injury to a valve stem when the split base portion 93 of the rim is contracted during assembling and disassembling of the rim. By providing the enlargement 180 in the opening 99, the major portion of the opening exposed to the upper surface of the rim, when the endless side ring is in its operative position, may be made of minimum width, thereby reducing the danger of the inner tube of the tire being forced through the opening by reason of the pressure therein.

The transverse split 94 includes a diagonally disposed portion 107 that extends from the valve stem opening to a point near the flange 95, and at such point communicates with a portion 101 of the split, which is substantially parallel to the axis of the rim. The latter portion of the split extends partially through the lower portion of the tire-engaging flange 95 and communicates with a reversely curved portion 102 of the split (Fig. 4) located in the radial side wall 115 of the tire-engaging flange. In turn, the curved portion 102 communicates with a diagonal portion 103 of the split located in the curved portion 116 of the tire-engaging flange 95. It is to be noted that one end of the split base portion 93 of the rim commensurate with the curved portion 102 of the split has a circumferentially projecting portion 105 which is disposed in a complementary recess 106 in the other end of the rim. By reason of this projecting portion 105 and the recess 106 in the respective ends of the split base portion, relative radial movement of the ends of the rim is effectively prevented. The ends of the split base portion commensurate with the diagonal portions 107 and 103 of the split are defined by substantially abutting surfaces inclined to radii of the rim extending to such portions of the split. Hence, one end of the rim slightly underlies the other end of the rim and by reason of such association of the ends of the rim, relative radial movement thereof is further prevented. The substantially straight portion 101 of the split, by reason of the pressure of a tire on the rim and frictional engagement of the ends of the rim, effectively prevents relative lateral movement of the ends of the rim. The ends of the base portion 93 commensurate with the straight portion 101 of the split, may also be defined by surfaces slightly inclined in either direction to radii of the rim extending thereto, or such surfaces may coincide with the radii of the rim extending thereto.

It is apparent that the end of the base portion 93 shown in the lower part of Figure 2 is prevented from moving to the right because the end portions of the opposite end of the rim commensurate with the diagonal portions 107 and 103 and the straight portion 101 of the split, prevent such movement. Movement of the end of the rim shown in the upper part of Figure 15 to the left also is effectively prevented by the end portions of the opposite end of the rim commensurate with the diagonal portions 107 and 103, and the straight portion 101 of such split. Movement of the end of the rim shown in the lower part of Figure 2 to the left is effectively prevented by the engagement of the ends of the rim commensurate with the straight portion 101 of the split and the engagement of the flange 97 with the endless side ring 35. Movement of the end of the rim shown in the upper part of Figure 2 to the right is effectively prevented by the frictional engagement of the ends of the rim along the straight portion 101 of the split.

While the split illustrated is preferred, it should be understood that it may be varied. For example, the end surfaces of the base portion commensurate with the diagonal portions 107 and 103 of the split, may be directed at opposing angles to radii of the rim extending thereto or they may be directed at similar angles but opposite to those shown by Figs. 2 and 4. Moreover, such surfaces need not be directed at an angle to the radii but may instead coincide therewith. Also, it is to be understood that the reversely curved portion 102 of the split may be varied and that the end surfaces of the rim commensurate therewith may be directed at various angles to the outer surfaces of the radial wall 115 of the flange 95.

The endless side ring 35 is provided with a tire-retaining flange 108 which comprises a substantially outwardly directed radial portion 118, and a substantially laterally directed portion 119. In accordance with the teachings of the parent application Serial No. 404,305 the endless side ring 35 may be secured to a wheel disc 20 by some suitable means such as the rivets 33. The portion 118 merges at its inner end with a cylindrical portion 109 parallel to the base member 100. The cylindrical base portion 109 is integral with a part 110 complementary to and normally disposed in the gutter 98 in the transversely split base portion 93 of the rim. The lower portion of the part 110 is provided with a laterally extending slot 111 substantially co-extensive with the inclined portion 96 and the radial flange 97 of the base member 93 and coinciding with the enlarged portion 100 of the valve stem opening 99.

Referring to Figs. 1 and 3, a latching member 120 is disposed in the laterally extending openings 100 and 111 of the transversely split base portion 93 and the endless side ring 35, respectively. This latching member has a circular base portion 121 of substantially the same diameter as the distance across the opening 100 and is pivoted to the endless side ring 35 by a pin 125 rotatably projecting through the cylindrical portion 109 of the latter. The outer end of the pin 125 is provided with a conical head 126 which coacts with a counter-bored opening 127 in the outer surface of the cylindrical portion 109. The head 126 so projects radially outwardly slightly beyond the outer peripheral surface of the cylindrical portion 109 that when a tire on the rim is inflated, pressure of the tire tends to prevent turning of the head 126 and consequently the latching member 120. The latching member is also provided with diametrically opposed, radially inwardly projecting lugs 135 and 136 terminating respectively in oppositely projecting portions 137 and 138 which are adapted to underlie the ends of the transversely split base member 93 on opposite sides of the opening 100 and thus prevent radially inward movement of such ends relative to the endless side ring 35.

Also the latching member 120 is provided with an operating handle 140 for facilitating turning of the latching member into its inoperative position, in which position the portions 137 and 138 are disposed within the opening 100 and free from engagement with the ends of the transversely split base portion 93. Opposite edges of the circular portion 121 of the latching member substantially engage the ends of the transversely split base portion defined by the opening 100 and prevent relative circumferential movement of the transversely split base portion and the endless side ring. The central portion of the latching member is provided with a semi-circular recess 145 which extends at right angles to the oppositely projecting portions 137 and 138. This recess is adapted to receive a laterally directed valve stem, which projects through openings 100 and 99 when the latch is in its operative position. In order to release the latch, it is necessary to displace the valve stem radially until it is free of the recess 145.

When a deflated tire is to be removed from the rim 37, the wheel member associated with that rim is removed from the hub of the vehicle wheel. Thereafter, the valve stem, because the tire is deflated, may be easily displaced from the recess 145 of the latch and the latch is turned to its inoperative position, as shown by Fig. 4. By means of a suitable tool (not shown), adapted to engage in a notch 150 in the radial flange 97 of the transversely split base portion 93 of the rim adjacent the enlarged portion 100 of the valve stem opening 99, the corresponding end of the transversely split base portion 93 may be displaced radially inwardly from engagement with the endless side ring until the transversely split base portion is entirely free from the endless side ring. The rim is assembled in a manner the reverse of that described for disassembling it.

Moreover, it is apparent that novel and efficient means have been provided for securing the outer peripheral parts of wheel members to rims and especially to rims composed of transversely split base portions and endless side rings. The latching device provided for retaining the transversely split base portion and endless side ring in securely locked relation is particularly adapted for employment in wheel assemblies of the character described in which the outer peripheral parts of the wheel members are secured to the endless side rings.

Although I have illustrated the preferred forms which the invention may assume and have described that form in detail, it will be apparent to those skilled in the art that the invention is not so limited but that various modifications may be made therein without departing from the spirit of the invention or from the scope of the appended claims.

What I claim is:

1. In a rim composed of a transversely split base member, having a gutter in its outer periphery at one of its sides, and an endless ring having a portion disposed in the gutter, the split in the base member terminating in an enlarged opening radially inward of the endless side ring, said opening being adapted to receive a valve stem of a tire mounted on the rim, a latch also disposed in the enlarged opening of the split and pivoted to the endless side ring, said latch having portions movable into engaging relation with the ends of the split base portion, and means including the valve stem for normally preventing movement of the latch to its inoperative position.

2. A rim comprising a transversely split base portion having a gutter at one side and a tire retaining flange at its other side, an endless side ring disposed in said gutter, said base portion having a valve stem opening extending from the outer side of the gutter to a point substantially centrally of said base portion, the split extending from the inner end of the valve stem opening through the remaining portion of the base, said valve stem opening being relatively large at its inner end as compared to that portion of the opening exposed to the radially outer surface of the rim when the endless side ring is in its operative position, in order to accommodate the valve stem during contraction of the split base portion.

3. A rim comprising a transversely split base portion having side gutter and an endless side ring removably seated in said gutter, the split in the base portion terminating in a valve slot adapted to receive the valve stem of a tire mounted on the rim, a latch disposed in the valve slot and pivotally fastened to the endless side ring, said latch having portions movable into engaging relation with the ends of the split base portion and means including the valve stem for normally retaining the latch engaged.

4. A rim comprising a transversely split base portion having side gutter and an endless side ring removably seated in said gutter, the split in the base portion terminating in a valve slot adapted to receive the valve stem of a tire mounted on the rim, a latch disposed in the valve slot, said latch having portions movable into engaging relation with the ends of the split base portion and means including the valve stem for normally retaining the latch engaged.

ALVA W. WOODWARD.